Jan. 13, 1970     R. H. BLAKELEY     3,489,056

BLIND RIVET

Filed Oct. 2, 1967     2 Sheets-Sheet 1

INVENTOR.
RICHARD H. BLAKELEY
BY
Christie, Parker & Hale
ATTORNEYS

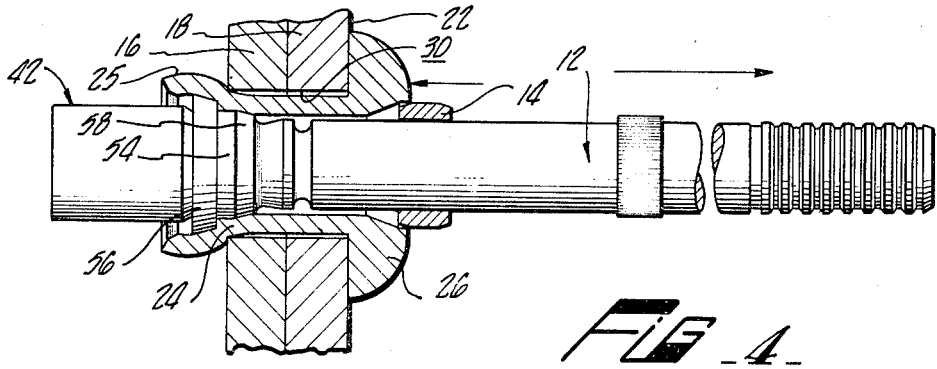
FIG_4_
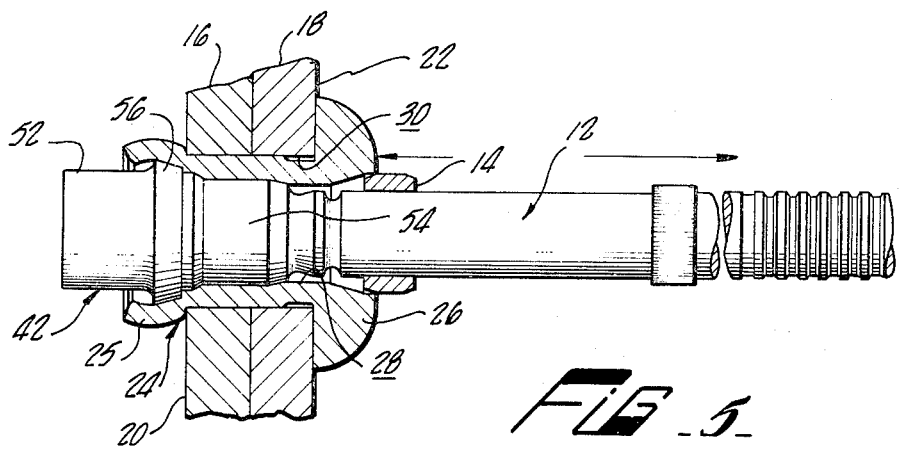
FIG_5_
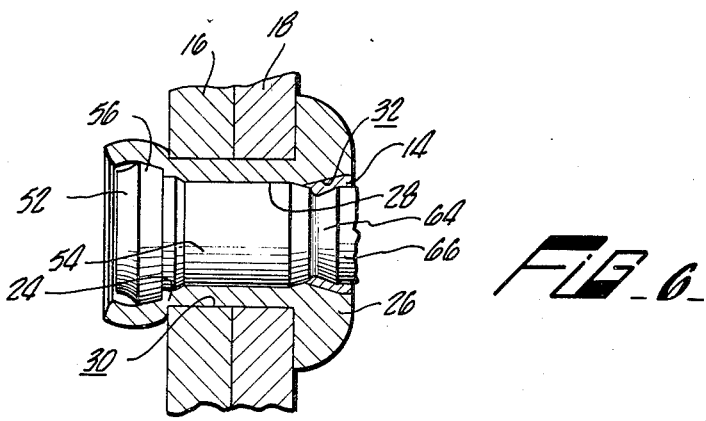
FIG_6_
INVENTOR.
RICHARD H. BLAKELEY
BY
Christie, Parker & Hale
ATTORNEYS

3,489,056
BLIND RIVET
Richard H. Blakeley, Encino, Calif., assignor to VSI Corporation, Pasadena, Calif., a corporation of Illinois
Filed Oct. 2, 1967, Ser. No. 672,114
Int. Cl. F16b *13/06*
U.S. Cl. 85—78    2 Claims

ABSTRACT OF THE DISCLOSURE

A tubular rivet is set by a stem which has a blind, wire drawable head and a shear collar. The rivet has a head and a tubular sleeve which receives the stem. The stem head includes a plug section and a cylindrical portion. The shear collar is between the plug section and the cylindrical portion. The cylindrical section is sized to be wire drawn through the bore of the sleeve and to expand the sleeve against the walls of a hole in two or more sheets of material. The shear collar shears from the stem head during the rivet's setting process to provide a part of a blind side lock. The collar is also responsible for expanding a portion of the sleeve to effect a blind side head. The plug section is wire drawn through the shear collar with a portion of the material of the plug section upsetting behind the collar to firmly lock the collar in place. The blind side lock of the set blind rivet is then provided by the expanded sleeve, shear collar and upset plug section.

Background of the invention

This invention relates to the art of fasteners and, more in particular, to blind rivets.

There are two particular types of blind rivets which have gained considerable acceptance in the industry. These rivets are described in U.S. Patents 2,931,532 and 3,148,578, both to R. H. Gapp.

The blind rivet described in U.S. Patent 2,931,532 includes a headed tubular rivet and a stem with a blind head. The tubular rivet is inserted into a hole in two or more sheets of material with the blind head of the stem on the blind side of the sheets. The rivet is set by applying an axial load in a direction away from the driving side of the sheets. The axial load will draw the blind head of the stem into the bore of the rivet sleeve to expand the sleeve and form a blind side head. As drawing progresses, the blind head of the stem is wire drawn into the portion of the rivet sleeve within the sheets. The wire drawing of the blind head expands the sleeve against the walls of the hole. This expansion of the sleeve within its hole creates a blind rivet which has very good fatigue and shear characteristics.

However, this blind rivet has not proven totally satisfactory when it is used in relatively thin sheets. In thin sheets, the wire drawing action of the blind head increases the diameter of the hole in the sheets. This expansion of the hole creates a weakness in axial loading because the blind head of the set fastener does not present a very large area of contact with the blind side of the sheets. In aggrevated cases, the stem can pull through the rivet sleeve during its setting.

The blind rivet described in U.S. Patent 3,148,578, on the other hand, has proven effective in thin sheet applications but has proven less than satisfactory in relatively thick, long grip sheet assemblies. The blind rivet described in this patent employs a tubular rivet similar to that described in U.S. Patent 2,931,532. The stem is modified, however, in that the blind head of the stem has a shear collar or ring with a conical section outside of the shear collar. When the rivet is being set, the shear collar bears in compression on the lower end of the rivet sleeve. The force exerted on the sleeve by the ring bulges an extending portion of the sleeve outwardly to form a blind head and acts to expand the body of the sleeve within the sheets against the walls of the hole around the sleeve. As drawing progresses, the shear collar shears away from the stem and moves up the cone section where it is held in place by a flange. The cone section, shear collar and expanded sleeve, then, provide a blind side lock and large blind side head.

The thickness problem alluded to with respect to U.S. Patent 3,148,578 is manifested by the incomplete filling of the hole in the relatively thick sheets. The only expanding force on the sleeve comes from the axial compression exerted by the shear collar. This compression produces progressively less expansion as the head or the driving side of the sheets is approached. The expansion is relatively independent of the thickness of the sheets and, therefore, as thickness increases, the possibility of completely filling the hole is reduced. When the sleeve of the rivet does not completely fill the hole, the fatigue and shear characteristics of the fastened joint suffer.

Summary of the invention

The present invention provides a grip-insensitive blind rivet which has the ability to completely fill the hole in which it is placed while providing an excellent blind side lock and large blind head. The invention also contemplates the method of setting of the blind rivet.

The blind rivet of the present invention includes a tubular rivet, a stem, and means for locking the tubular rivet and stem together to set the fastener.

The tubular rivet includes a rivet sleeve, a rivet head, and an axial bore through the sleeve and head. The sleeve is adapted for insertion through a hole in two or more sheets of material with a portion of the sleeve extending beyond the blind side of the sheets. The head of the rivet is adapted to abut the driving side of the sheets.

The stem includes a blind head and a shear collar. The stem head is wire drawable through the sleeve to expand the sleeve against the walls of the hole in which the blind rivet is inserted. The shear collar is integral with the stem head and is sized to expand the portion of the sleeve which extends beyond the blind side of the sheets. The expanded sleeve constitutes a blind head. At a predetermined point in the setting process, the shear collar shears from the stem head and thereafter remains in a relatively fixed position with respect to the moving stem. A plug section is provided on the stem head which is axially aligned with and to the rear of the shear collar. The plug section is characterized in its ability to upset behind the shear collar to augment the expanded, extending portion of the sleeve and shear collar in providing a blind side lock. In terms of occurrence, the plug section, when it encounters the sheared shear collar and while it is experiencing a force in the direction of the rivet head, will upset behind the collar.

In preferred form, the collar and stem head are constructed such that when the collar shears from the stem head and is arrested against motion by the reaction force exerted on it from the blind side sheet material through the expanded sleeve, the plug section will wire draw through the sheared collar while at the same time upsetting behind the collar. It is also preferred to provide a cylindrical portion on the blind head of the stem. This cylindrical portion is on the opposite side of the shear collar from the plug section and is slightly greater in diameter than the diameter of the bore of the rivet sleeve before expansion. The cylindrical portion is capable of being drawn into the bore in the sleeve to expand the sleeve while it is being wire drawn. The plug section, because it is wire drawable, augments the material available to completely fill that portion of the sleeve's bore which is between the blind and driving side of the sheets.

It is also preferred to provide an annular groove in the plug section where it meets the shear collar. The diameter of the groove has a minimum value at least approximately equal to the diameter of the cylindrical portion. The annular groove assures that the shear collar will shear along a diameter less than that of the plug section. This assures the retention of the shear collar while the fastener is being set and the upsetting of the plug section behind it.

In addition, the cylindrical portion and the shear collar are preferably provided with tapers to facilitate the entrance of the cylindrical portion into the portion of the sleeve between the sheets and the shear collar into that portion of the sleeve which extends beyond the blind side. A complementary interior chamber in the sleeve may be provided to facilitate the entrance of the shear collar.

The balance of the blind rivet of the present invention is standard. The locking means may be in the form of a locking collar which is adapted to be received in a locking groove proximate the cylindrical portion of the blind stem head. The stem may be provided with a pulling portion which includes circumferential grooves to provide a grip for a setting tool. A breakneck groove may also be provided for the severance of the pulling portion from the balance of the stem after the stem is locked to or in the rivet.

The blind rivet of the present invention is set by inserting the assembled rivet into a hole in two or more sheets of material with the head of the rivet on the driving side of the sheets and a portion of the rivet sleeve extending beyond the blind side of the sheets. In this assembled condition, the blind head of the stem and shear collar are outwardly of the blind side of the sheets and the terminal end of the sleeve. The head of the rivet is axially constrained against the driving side of the sheets. With the rivet so constrained, a force is exerted in the opposite direction on the stem to pull it in a direction away from the driving side of the sheets. This pulling forces the shear collar into the extending portion of the sleeve and radially expands the sleeve to produce a blind side head. Eventually, the shear collar will reach a position where it is constrained by the expanded portion of the sleeve and the blind side of the sheets. At this point and with continued pulling of the stem, the shear collar will shear along its shear diameter from the stem head. The cylindrical portion of the stem head will enter the portion of the sleeve which is within the sheets and will expand this portion against the walls of the hole in the sheets while wire drawing through the sleeve. The plug section is also wire drawn. But the initial wire drawing of the plug section is through the sheared collar. The wire drawing through the sheared collar brings the diameter of the plug section down to that of the cylindrical section. While being wire drawn through the sheared collar, the collar expands somewhat radially. The action of the plug section and the sheared collar may also include some broaching. Much of the material of the plug section will reconstitute the cylindrical section and will therefore be wire drawn into that portion of the sleeve between the sheets. While it is being wire drawn, the plug section is also upsetting on the back side of the sheared collar to keep the collar in place and augment the blind side lock provided by the expanded sleeve body and sheared collar. When the portion of the sleeve within the sheets is completely expanded and the hole completely filled, the stem and rivet sleeve are locked together. The fastener is then set.

The blind rivet of the present invention has many advantages over the blind rivets described in the previously referred to patents and the prior art in general. The blind head of the stem is wire drawn into the sleeve between the sheets. This wire drawing causes the body of the sleeve to expand against the walls of the hole in which it is inserted and therefore the fatigue and shear resistance of the fastened joint is optimized. Together with the facility for completely filling the hole in the sheets in which the blind rivet is installed, the blind rivet of the present invention provides an excellent blind side lock because of the presence of the shear collar and the upset portion of the plug section. As was previously mentioned, U.S. Patent 3,148,578 does not rely on wire drawing as the means for expanding the sleeve to fill the hole in which it is inserted, but instead upon axial compression provided by its shear collar. With a relatively large grip, the hole is rarely completely filled. U.S. Patent 2,931,532 does relay on wire drawing to expand the rivet body against the walls of the hole in which it is inserted. However, as was previously pointed out, in thin sheet applications the wire drawing had a tendency to expand the hole in which the rivet sleeve is placed. Because the blind side head provided by the sleeve is necessarily small in that the blind head of the stem has a relatively small diameter, the blind side lock provided by this type of rivet may be inadequate. The positive lock provided by the shear collar of the present invention overcomes this difficulty because the blind head provided by the expanded, extending portion of the sleeve is large. In addition, the upsetting of the plug section behind the shear collar insures that the shear collar is accurately maintained in place with a positive force.

These and other features, aspects and advantages of the present invention will become more apparent from the following description, appended claims, and drawings.

Brief description of the figures

FIG. 4 shows the previously illustrated fastener with the blind head almost completely formed and the stem head just entering the portion of the sleeve between the sheets;

FIG. 5 shows the fastener previously illustrated with the blind head of the stem being wire drawn through the sleeve portion between the sheets and the plug section upsetting behind the arrested shear collar; and FIG. 6 illustrates the set fastener with the blind head of the stem wire drawn completely through the sleeve to expand its walls against the walls of the hole in the sheets, the plug section upset behind the sheared shear collar, and the stem and sleeve locked together with a locking ring.

Description of the preferred embodiments

Figure 1:
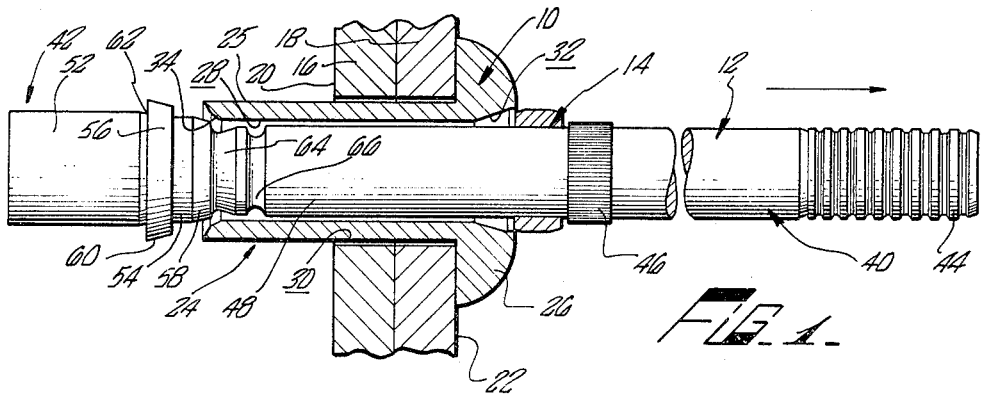
FIG. 1 is a view, partly in half-section, of a preferred form of the blind rivet of the present invention as it would appear when initially inserted through a hole in a pair of sheets.

The blind rivet illustrated in the figures generally includes a tubular rivet 10, a stem 12 and a locking ring 14. The sequence of figures shows the blind rivet as it would appear during progressive stages of its setting in a pair of sheets 16 and 18. The blind side of the sheets is indicated by reference numeral 20 while the driving side is indicated by reference numeral 22.

Rivet 10 includes a sleeve portion 24 and a head 26 with an axial bore 28 extending through the sleeve and the head. Rivet 10 is shown inserted in sheets 16 and 18 in a hole 30. Typically, the outer diameter of sleeve 24 is less than the diameter of the hole in the sheets. A portion of the sleeve extends beyond blind side 20. This portion is indicated by reference numeral 25. Head 26 includes a tapered circumferential counterbore 32 for receiving locking collar 14. The head is typically disc shaped with a rounded top. The undersurface of the head may be dished such that only its lateral periphery contacts surface 22. This undersurface geometry is often employed to prevent dimpling of the driving surface. A starting interior chamfer 34 may be provided at the blind or terminal end of sleeve 24 opposite head 26. This chamfer facilitates the entrance of a blind head of the stem and shear collar.

Stem 12 includes a pulling section 40 and a blind head 42. Pulling section 40 has a plurality of circumferential lands or grooves 44 and a serrated section 46. Serrations 46 prevent ring 14 from sliding off stem 12 during the initial stages of tool engagement. Lands 44 are provided for a setting tool and cooperate with the tool in a well known manner. Pulling section 40 further includes an end section 48 which is disposed within bore 28 before the blind rivet is set.

The blind head of stem 12 includes a plug section 52 and a cylindrical portion 54. These two portions of the blind head of the stem are separated by a shear collar 56. Cylindrical section 54 is slightly larger in diameter than the inner diameter of sleeve 24, that is, bore 28. The larger diameter of cylindrical portion 54 allows it to expand the extending portion 25 of sleeve 24 as it enters the sleeve and to be wire drawn through bore 28. To facilitate the entrance of cylindrical portion 54 into bore 28, a chamfer 58 may be provided. This chamfer mates with the interior counterbore 34 during the initial stages of the setting process. If desired, one or the other of these chamfers may be eliminated. Shear collar 56 is preferably frusto-conical in shape with an inwardly converging, tapered surface 60. This surface may also be rounded. The tapered surface facilitates the entrance of the shear collar into bore 28. In some configurations, it may be desirable to have shear collar 56 cylindrical. In this event it would be necessary to have interior chamfer 34 to insure the entrance of the collar into bore 28 and prevent axial compression of the sleeve.

Plug section 52 is outwardly disposed of and contiguous with shear collar 56. The plug section meets the shear collar at a groove 62. The smallest diameter of groove 62 is approximately equal to the diameter of cylindrical section 54. The shear diameter of shear collar 56 will therefore be approximately that of cylindrical portion 54. Plug section 52 is slightly larger in diameter than cylindrical portion 54. Because of its larger diameter, plug section 52 will upset behind shear collar 56 when the latter is sheared from stem head 42.

The balance of stem 12 includes a receiving notch or locking groove 64 for receipt of locking collar 14. Receiving notch 64 is inwardly of cylindrical section 54 and is contiguous therewith. A breakneck groove 66 is also provided to separate the pulling portion of stem 12 from its blind head at the conclusion of the blind rivet's setting.

Locking collar 14 is of standard design. It is ring shaped, preferably with starting chamfers, and may be continuous in circumference or split.

The setting of the blind rivet will now be described. Initially, tubular rivet 10 and stem 12 are inserted into hole 30 with head 26 abutting driving side 22 of sheet 18. Stem 12 is received by bore 28 with blind stem head 42 on blind side 20 of sheet 16. The stem and rivet are, of course, assembled before this insertion step. Locking collar 14 is on stem 12 adjacent cavity or counterbore 32 and end section 48 of the stem.

Figure 2:
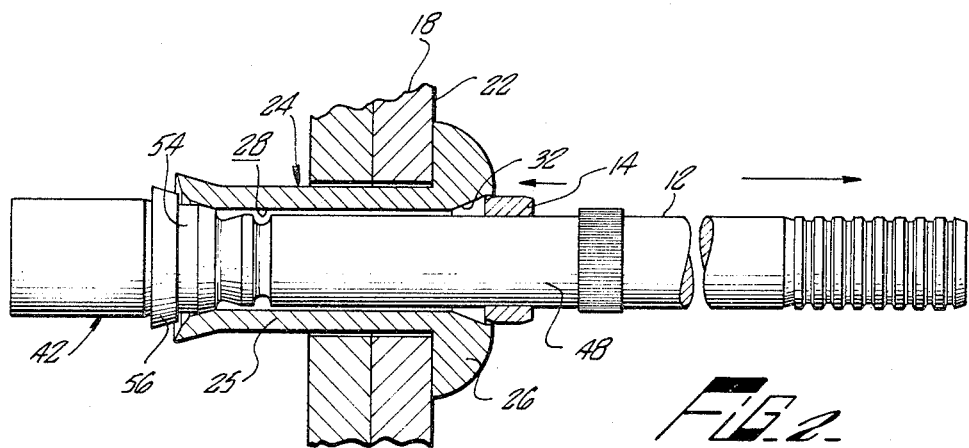
FIG. 2 is a view, partly in half-section, of the blind rivet of FIG. 1 showing the blind stem head entering an extending portion of the rivet sleeve.

In FIGURE 2 the setting operation has just commenced. An axial force is maintained on stem 12 in a direction away from driving side 22 of sheet 18. This force tends to draw blind head 42 of the stem inside bore 28 of extending portion 25 of sleeve 24. An axial restraining force is maintained on head 26 to keep it in its abutting relationship with sheet 18. Locking collar 14 remains adjacent head 26. Cylindrical section 54 has entered bore 28 of sleeve 24 and has begun to radially expand the protruding or extending portion of the sleeve as the initial blind head forming aspect of the setting process. This expansion allows the easy ingress of shear collar 56.

Figure 3:
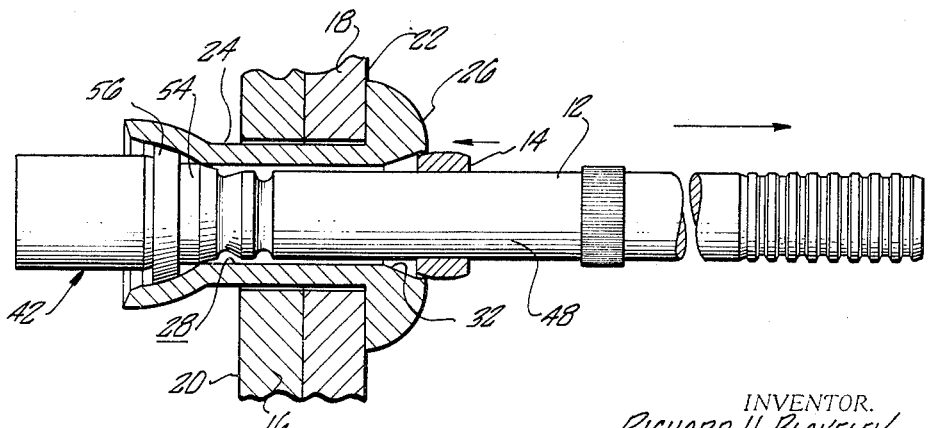
FIG. 3 is a view of the previously shown fastener, partly in half-section, illustrating the formation of a blind head produced by the shear collar expanding the extending portion of the sleeve.

FIGURE 3 illustrates the condition of the blind rivet after further pulling on stem 12. Again, the axial load being applied on stem 12 is away from the blind side 20 of sheet 16 and the retraining force is being applied on head 26 to maintain it in position. Locking collar 14 is still adjacent cavity 32 of the rivet's head. End portion 48 has progressed relatively far from its starting point shown in FIGURE 1. Shear collar 56 has entered bore 28 and has expanded the extending portion of sleeve 24 into a bell shaped head. Cylindrical section 54 of blind stem head 42 is just outside of blind side 20 of sheet 16. The blind rivet in the condition illustrated in FIGURE 3 has not begun the wire drawing portion of the process.

The initial stages of wire drawing are illustrated in FIGURE 4. Again, the axial setting force is maintained on stem 12 and continues to pull the stem outwardly of driving side 22 of sheet 18. Restraint is still provided for head 26. Locking collar 14 is maintained in the position depicted in FIGURE 3. Cylindrical portion 54 has just entered that portion of bore 28 between sheets 16 and 18 and begins to wire draw. Its entrance was facilitated by its chamfer 58. Sleeve 24 is being expanded by the entering cylindrical portion 54 of blind stem head 42 against the wall of hole 30 in the sheets. The blind side head provided by the expanding portion 25 of sleeve 24 outside of sheet 16 is almost in its final configuration. Shear collar 56 has reached a point where it will begin to feel a reaction force exerted on the expanded portion of sleeve 24 by the corner of the blind side of hole 30.

In FIGURE 5, shear collar 56 has been sheared along its shear diameter from blind stem head 42. The shearing action was produced by a reaction force exerted through the expanded portion 25 of sleeve 24 by sheet 16. The reaction force was to the axial force applied to stem 12. Shear collar 56, therefore, is constrained against further movement towards the driving side of the sheets. Plug section 52, because of its larger diameter, will begin to upset behind the arrested shear collar. This upsetting action may more accurately be characterized as a rolling of the outer portions of the material of plug section 52 as the plug section is being drawn in the direction of the applied force on stem 12. The arrested shear collar 56 provides a drawing die for the more interior portions of plug 52. The plug will therefore be wire drawn through the shear collar and supply material to cylindrical portion 54 in order that the latter may completely fill bore 28 in sleeve 24. Cylindrical portion 54 is shown in FIGURE 5 as being completely within sheets 16 and 18. In this position, the walls of sleeve 24 are expanded tightly against the walls of hole 30 in the sheets. The expansion is not quite, however, complete because cylindrical portion 54 has not been completely wire drawn through bore 28. In the configuration shown in FIGURE 5, the blind side head provided by expanded portion 25 of sleeve 24 is completed. The expanded portion of sleeve 24, because of its elasticity, has tucked in slightly behind the arrested shear collar 56. This augments the strength of the blind rivet. Expanded portion 25, now a blind side head, contacts blind side 20 of sheet 16 over a relatively large area because of the relatively large diameter of shear collar 56. Moreover, the setting forces have tightly clamped the sheets together between expanded portion 25 and rivet head 26. This clamp up is secured by the final setting of the blind rivet.

FIGURE 6 depicts the set blind rivet. In the configuration shown in this figure, plug section 52 has been almost totally wire drawn through the arrested shear collar 56 and into the bore 28 of sleeve 24. The material supplied by plug section 52 to cylindrical section 54 allowed the latter to be completely wire drawn through sheets 16 and 18 and to expand the walls of sleeve 24 tightly against the walls of hole 30 in the sheets. Depending on the grip required of the blind rivet, more or less of plug section 52 will be used to augment the material of cylindrical section 54 in expanding and filling that portion of bore 28 and sleeve 24 between sheets 16 and 18. In the embodiment shown, the grip, that is, the distance between blind side 20 and driving side 22 of sheets 16 and 18 is about at a maximum. Locking collar 14 has been driven into counterbore or cavity 32 of head 26 and into locking groove 64. As such, it has been deformed into a locked-in position. The portion of stem 12 outside of locking groove 64 has been severed away by failure at breakneck groove 66. A portion only of groove 66 is shown in FIGURE 6 to represent this failure. The final setting action and indeed the entire setting operation may be performed with a standard setting tool.

A standard setting tool maintains the head of the blind rivet against the driving side of the sheets while applying an axial load on the stem in a direction away from the driving side of the sheets to draw the blind head and shear collar inwardly towards the tubular rivet. During this drawing process, locking groove 64 will reach a position to receive locking collar 14. At this point the constraining load applied to head 26 is shifted to collar 14 to drive and deform the collar into locking groove 64. The shift in load does not, obviously, affect the final strength of the fastened joint. The axial load on stem 12 is maintained until failure at breakneck groove 66.

What is claimed is:
1. An improvement in a blind rivet of the type which includes a rivet sleeve, a rivet head on the sleeve, a bore through the rivet sleeve and rivet head, a stem having a head, and means for locking the stem and rivet together to set the blind rivet, the rivet sleeve being capable of receipt in a hole in at least two sheets with the rivet head on the driving side of the sheets and with a portion of the sleeve extending beyond the blind side of the sheets, the stem being capable of receipt in the rivet sleeve with the stem head on the blind side of the sheets, at least a portion of the stem head being wire drawable to expand the sleeve against the walls of the hole in the sheets, the improvement which comprises:
   (a) a shear collar integral with the stem head having a diameter larger than the diameter of the bore but no larger than the outside diameter of the sleeve to enter and expand the extending portion of the sleeve to form a blind head as the stem head is pulled inwardly towards the blind side of the sheets, the shear collar being capable of shearing from the stem head when the blind head is formed;
   (b) the stem head having a cylindrical portion axially adjacent the shear collar towards the rivet head, the cylindrical portion being slightly larger in diameter than the bore and wire drawable through the rivet sleeve to expand the sleeve against the walls of the hole in the sheets; and
   (c) the stem head having a plug section axially aligned with and rearwardly disposed of the shear collar, the plug section having an annular groove contiguous with the shear collar, the annular groove of the plug section having a diameter where it meets the collar at least approximately equal to the diameter of the cylindrical portion, the plug section being wire drawable through the shear collar and larger in diameter than the cylindrical portion, the plug section also being capable of upsetting behind the shear collar after the latter has sheared by having material of the plug section roll up behind the shear collar to a diameter larger than the original diameter of the plug section before upset, the upsetting of the plug section augmenting the expanded, extending portion of the sleeve and the shear collar in providing a blind side lock.

2. The improvement claimed in claim 1 wherein:
   (a) the shear collar has a starting chamfer to facilitate the collar's entrance into the extending portion of the rivet sleeve; and
   (b) the cylindrical portion has a starting chamfer to facilitate the cylindrical portion's entrance into the extending portion of the rivet sleeve.

References Cited
UNITED STATES PATENTS

| | | | |
|---|---|---|---|
| 2,372,222 | 3/1945 | Mullgardt | 85—78 |
| 3,038,626 | 6/1962 | Simmons | 85—78 |
| 3,148,578 | 9/1964 | Gapp | 85—77 |
| 3,302,510 | 2/1967 | Gapp | 85—77 |
| 2,931,532 | 4/1960 | Gapp | 85—78 |
| 3,102,571 | 9/1963 | Scott | 151—77 |
| 3,369,289 | 2/1968 | Gapp | 85—72 |
| 3,377,908 | 4/1968 | Stau et al. | 85—78 |

MARION PARSONS, JR., Primary Examiner